United States Patent [19]

Brixius et al.

[11] Patent Number: 4,474,855

[45] Date of Patent: Oct. 2, 1984

[54] COATED ARTICLE

[75] Inventors: Darryl W. Brixius, Grosse Ile, Mich.; John A. Simms, Wilmington, Del.

[73] Assignee: E. I. Du Pont de Nemours and Company, Wilmington, Del.

[21] Appl. No.: 560,748

[22] Filed: Dec. 12, 1983

Related U.S. Application Data

[60] Division of Ser. No. 328,113, Dec. 7, 1981, Pat. No. 4,446,175, which is a division of Ser. No. 195,081, Oct. 8, 1980, Pat. No. 4,351,744, which is a continuation-in-part of Ser. No. 53,301, Jun. 29, 1979, abandoned, which is a division of Ser. No. 819,121, Jul. 26, 1977, abandoned.

[51] Int. Cl.$^3$ ............................................. B32B 27/40
[52] U.S. Cl. .................................... 428/425.8; 427/44; 427/54.1; 427/385.5; 427/388.2; 428/423.1
[58] Field of Search ...................... 427/44, 54.1, 385.5, 427/388.2; 428/425.8, 423.1

[56] References Cited

U.S. PATENT DOCUMENTS 2,718,516  9/1955  Bortnick .............................. 526/312

*Primary Examiner*—Christopher A. Henderson

[57] ABSTRACT

Articles comprising a substrate coated with selected isocyanatoalkyl (meth)acrylate polymers or copolymers, e.g., a copolymer of 2-isocyanatoalkyl methacrylate and butyl acrylate, are claimed.

10 Claims, No Drawings

COATED ARTICLE

RELATED APPLICATIONS

This application is a division of our copending application Ser. No. 328,113, now U.S. Pat. No. 4,446,175, which was filed Dec. 7, 1981, as a division of our copending application Ser. No. 195,081, filed Oct. 8, 1980 and now U.S. Pat. No. 4,351,744, issued Sept. 28, 1982. Ser. No. 195,081 was filed, as a continuation-in-part of our now abandoned but then-copending application, Ser. No. 053,301, filed June 29, 1979, as a division of our then-copending application, Ser. No. 819,121, filed July 26, 1977, but now also abandoned. All four of these earlier applications are specifically incorporated by reference herein.

BACKGROUND OF THE INVENTION

1. Field of the Invention

This invention relates to protective and decorative coatings formed from isocyanate-containing acrylic polymers and more particularly from polydisperse low-molecular weight polymers having terminal monosulfide groups and low toxicity.

2. Prior Art

Bortnick U.S. Pat. No. 2,718,516 (1955) describes high-molecular weight polymers based on (meth)acrylic ester isocyanates and containing a plurality of isocyanate groups (see Comparative Example A, below).

Certain organic polyisocyanates of low molecular weight are used commercially, e.g., as crosslinking agents. In some cases, these have recently been found to contain, upon aging, excessive levels of residual monomeric diisocyanate, thereby increasing the toxicity.

SUMMARY OF THE INVENTION

According to the present invention, there are provided coatings formed from acrylic polymers containing at least 10% by weight of the polymer of (co)polymerized isocyanatoalkyl acrylate or isocyanatoalkyl methacrylate, having a general structure fully detailed below, with terminal monosulfide groups and a polydisperse molecular weight distribution in which the number average molecular weight, determined by gel permeation chromatography utilizing polystyrene standards of polydispersity less than 1.1, is 500–10,000. The polymers result from a direct polymerization process between the monomers initiated by conventional initiators and mercaptan chain-transfer agents in a substantially nonaqueous medium and in the substantial absence of Lewis bases.

DESCRIPTION OF THE INVENTION

The isocyanate-functional acrylic polymers of this invention are homopolymers or copolymers of isocyanatoalkyl acrylates or isocyanatoalkyl methacrylates and contain at least one terminal monosulfide group for every ten polymer molecules. The polymer results from a direct polymerization process between the monomers initiated by conventional initiators and mercaptan chain-transfer agents in a substantially nonaqueous medium and in the substantial absence of Lewis bases.

The isocyanato monomers usable here are generally isocyanatoalkyl acrylates and methacrylates in which the alkyl groups have up to 8 carbons, i.e., are "lower" alkyls. They include isocyanatoethyl acrylate, isocyanatoethyl methacrylate (IEM), isocyanatobutyl acrylate, isocyanatobutyl methacrylate, isocyanatohexyl acrylate, and isocyanatohexyl methacrylate. IEM is a preferred monomer from the standpoint of ease of copolymerization and availability. More than one of these monomers can, of course, be employed simultaneously.

The acrylic polymers contain at least 10% by weight of the isocyanate monomer, preferably 15-70% and most preferably about 46%. For certain applications, no additional monomer is necessary and the homopolymer can be used.

Among other monomers which can be used to copolymerize with the isocyanate monomer, i.e., to provide polymers where not all X in the formula below is —COO—A—NCO, are the following: alkyl acrylates of up to 12 carbon atoms in the alkyl group, such as ethyl acrylate, butyl acrylate, and 2-ethylhexyl acrylate; alkyl methacrylates of up to 12 carbon atoms in the alkyl group, such as methyl methacrylate, the isomeric butyl methacrylates, hexyl methacrylate, 2-ethylhexyl methacrylate and lauryl methacrylate; styrene; ethylene; vinyl esters such as vinyl acetate; and vinyl chloride. More than one of these monomers can be employed simultaneously, if desired, e.g., methyl methacrylate and 2-ethylhexyl acrylate; styrene and n-butyl acrylate; methyl methacrylate, styrene, and butyl acrylate; etc. It will be appreciated that specified properties can be built into the polymer by the use of selected monomers as is customary with acrylic polymers, e.g., methyl methacrylate for hardness and durability, butyl acrylate for flexibility or 2-ethylhexyl acrylate for aliphatic hydrocarbon solubility.

The comonomers can be present at levels not exceeding 90% by weight of the polymer or can be absent. Preferably, these monomers comprise 85 to 10% by weight of the polymer, and most preferably 50 to 75% (exclusive of mercaptan).

The polymers of this invention have low molecular weights, the number average molecular weight ranging from 500 to 10,000 and preferably from 1,000 to 5,000. To obtain such molecular weight ranges, it is conventional technique to utilize either high levels of initiators or chain-transfer agents.

It has been found unexpectedly that, in spite of the general reactivity of isocyanate groups with compounds containing active hydrogen, the polymers of this invention can be prepared using mercaptans as chain-transfer agents. During the polymerization reaction, substantially no isocyanate groups in the isocyanate-containing monomers are consumed by the —SH functionality of the mercaptan chain-transfer agent and polymers having the following general formula result:

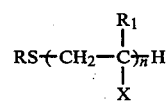

where
RS is the residue of a mercaptan chain-transfer agent,
$R_1$ is hydrogen or methyl;
X is COO—A—NCO or a mixture of COO—A—NCO and at least one of phenyl, $COOR_2$,

Cl, H;

where A is an alkylene group having 2–6 carbon atoms, and $R_2$ is an alkyl group having 1–12 carbon atoms; and n is 2–400 so that the polymer has a number average molecular weight, determined by gel permeation chromatography, utilizing polystyrene standards of polydispersity less than 1.1, of 500–10,000.

The polymer contains as many monosulfide groups per polymer molecule as are dictated by the equivalent mole ratio of chain-transfer agent to initiator. For the purpose of this invention, this ratio cannot be less than 1:10, yielding a polymer wherein at least 10% by number of the acrylic polymer molecules contain molecules of the structure indicated above. Preferably, 25–90% of the resulting polymer molecules will have the indicated structure.

The amount of chain-transfer agent used can be determined by a number of factors, among others: the desired molecular weight of the polymer and the desired ratio of number of polymer molecules having terminal thioalkyl groups to other, initiator related, terminal groups. Chain-transfer agent can comprise about 1–20% by weight of the polymer, preferably 3–15% and most preferably 5–10%.

The polymers are generally prepared by direct polymerization of the monomers and the chain-transfer agent in solution in a substantially nonaqueous or anhydrous medium substantially free of Lewis bases, i.e., in slightly acid solution. Acidity, or the substantial absence of Lewis bases, can be insured by the hydrolyzable chloride in the isocyanatoalkyl (meth)acrylates used. As normally prepared, these contain at least about 0.005% hydrolyzable chloride. If this figure (50 ppm) is maintained, sufficient acidity exists under the anhydrous conditions employed to avoid reaction with mercaptan. Excessive levels of chlorine (ca. 0.5%), however, give deleterious results.

Reaction temperature can vary to some extent. It must be high enough to decompose the initiator. If, however, the temperature gets too high, the competing reaction apparently producing a thiourethane is favored. When n-dodecyl mercaptan is used, the upper limit is about 120° C. When the sterically hindered t-dodecyl mercaptan is employed, the temperature can be raised a few degrees. See Example 8, below.

The physical manipulations involved are simple. A basic charge of part of the anhydrous monomers is prepared, usually in a solvent, and heated to reflux. The chain-transfer agent, polymerization initiator and the remainder of the monomeric reactants are added continuously over a period of several hours, usually about 5. Reflux is continued for a time, e.g., about an hour, to insure complete reaction. Heat is then removed and the product diluted, if desired. If the total charge is small, batch procedure can, of course, be safely used.

Among useful solvents are the following: aromatics such as toluene and xylene, lower alkyl acetates such as ethyl acetate and butyl acetate, aliphatics such as cyclohexane and heptane, ketones such as methyl ethyl ketone and methyl isobutyl ketone, ether esters, lower alkyl ethers of ethylene glycol and acetates, lower alkyl ethers of diethylene glycol and acetates, and the like. The solvent chosen, of course, should not be one which boils at a temperature high enough to favor the production of a thiourethane.

Any mercaptan chain-transfer agent can be used in the polymerization. A formula for these agents may be written as R—S—H with R—S— as the residue which attaches to the polymer. In this formula, R is generally alkyl, aryl or

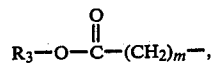

$R_3$ being alkyl or aryl and m being an integer from 0 to 8. Specific usable mercaptan chain-transfer agents, include: butyl mercaptan, octyl mercaptan, lauryl (or n-dodecyl) mercaptan, t-dodecyl mercaptan, benzyl mercaptan, benzene thiol, cyclohexyl mercaptan, n-butyl-3-mercaptopropionate and 2-ethylhexyl-3-mercaptopropionate. Lauryl mercaptan and t-dodecyl mercaptan are preferred.

Various polymerization initiators can be used to catalyze the polymerization of the isocyanate-monomers alone or in combination with other monomers, for example, azobis(isobutyronitrile), t-butyl peroctoate, t-butyl perbenzoate, t-butyl peracetate, benzoyl peroxide and compounds sold under the trademarks Luazo ®96, 1-t-butylazo-1-cyanocyclohexane, and Luazo ®82, 2-t-butylazo-2-cyanobutane.

Depending on the type and amount of initiator, type and amount of chain-transfer agent, and their ratio to each other, the molecular weight and polydispersity of the final polymer can be regulated as necessary. As noted, the number average molecular weight range of the polymer of this invention is 500–10,000 while the polydispersity does not exceed 4.

To achieve the nontoxic final polymers substantially free of toxic monomeric isocyanates, the polymerization is preferably carried out by feeding monomer to the polymerization vessel in a predetermined manner. Relative feed rates of monomers can be calculated from the reactivity ratios of the monomers. Compare, for example, George B. Butler et al., Editors, "Mathematical Modeling of Polymerization Reactions," Reviews in Macromolecular Chemistry, 9, 1–52, Marcel Depper, New York (1973). Careful control can reduce the residual isocyanate monomer content to 2000–500 ppm. Additional reductions, e.g., down to 300 ppm, can be achieved by holding the spent reaction mixture at elevated temperatures, e.g., 50°–60°, for a protracted period, e.g., 60 days, because of homopolymerization of the monomer. These concentrations of isocyanate, of course, refer to concentrations at the high solids level of polymer as prepared.

The absence of residual monomeric isocyanate in the polymeric product leads to a level of safety unknown in moisture-curing finishes based on oligomers and adducts made from difunctional isocyanates such as hexamethylene diisocyanate, bis(cyclohexyl)methane diisocyanate, isophorone diisocyanate, and 2,4-toluene diisocyanate. 2-Isocyanatoethyl methacrylate is about half as toxic by inhalation as are these diisocyanates and can be readily copolymerized to a free isocyanate level a tenth to a thousandth of that usually found in conventional diisocyanate-based polyisocyanates.

The isocyanate-acrylate polymeric products are colorless to amber amorphous solids or viscous liquids extremely soluble in common organic solvents such as those listed above. Solutions containing 60 or even 75% by weight of solids can readily be obtained. The low solvent content of such solutions is important in reducing air pollution from solvent evaporation. The products are very sensitive to moisture and small amounts may cause solutions in organic solvents to gel. Drying of reactants and solvents may, in fact, be desirable. The solids are readily recovered by evaporation of solvent.

The low-molecular weight isocyanate polymers of this invention have advantages over isocyanates heretofore known. For example, in comparison with the known high-molecular weight polymers, e.g., those of Bortnick, supra, they are more stable against moisture, are more effective in coating compositions in filling in small scratches, and are more soluble in organic solvents and, when used, reduce toxic solvent fumes. Furthermore, in comparison with commercial polyisocyanates used as crosslinkers (Desmodur N), they show much less tendency to break down into toxic isocyanate monomers.

The polymers of this invention are quite useful as crosslinking agents. Because of their relatively low molecular weight and low toxicity, they can be substituted for conventional organic polyisocyanates in a variety of coatings applications. Polymers containing complementary functional groups such as hydroxyl, amino or carboxyl, when cured with the isocyanate-functional polymers, afford coatings of excellent flexibility and durability. Polymercaptans can also be used when in the presence of tertiary amine catalysts.

The polymers can also serve as backbone polymers for grafting reactions, utilizing the —NCO groups as the graft sites. Some or all of these can be reacted with polymers containing only one complementary group, such as —OH, —$NH_2$ or —$NHR_3$ and —COOH, per polymer molecule, to obtain graft polymers having the original isocyanate-functional polymer as its backbone and the original monofunctional polymers as the grafted side-chains. Preparing graft polymers in this manner is advantageous over the more common graft polymerization techniques which utilize free radical initiated grafting to sites having active hydrogen atoms. The present method affords control over the extent of grafting, from substantially complete, i.e., approximately 95% or higher, reaction of the available —NCO groups, through gradations of 80%, 50%, 20%, etc., of the number of isocyanate groups utilized.

Another way in which these isocyanate-functional polymers can be used in grafting reactions is by first reacting some or substantially all of the —NCO groups present in the polymer with polymerizable monomers containing functional groups which are reactive with the —NCO groups. These functional group-containing monomers are exemplified by hydroxyethyl acrylate, hydroxypropyl methacrylate, acrylic acid, methacrylic acid, and N-t-butylaminoethyl methacrylate. In the second step, the polymers so obtained now containing pendent polymerizable double bonds, can be graft copolymerized with any of the conventional monomers, e.g., one or more $\alpha,\beta$-ethylenically unsaturated monomers.

Polymers containing pendent polymerizable double bonds based on the present isocyanate-functional polymers can also be utilized for purposes other than to serve as the backbone polymers for further graft copolymerization. These polymers can be cured through the use of conventional free radical catalysts, ultraviolet radiation or electron-beam radiation to yield hard coatings.

The polymers of this invention can also be reacted with difunctional compounds having groups of differential reactivity to provide reactive sites on the polymers which are removed farther from the polymer backbone than is commonly possible. For example, if the polymers are reacted with an amino-alcohol, the product will be a polymer having hydroxyl groups removed from the chain by several carbon atoms. Some or substantially all of the isocyanate groups can be so reacted. An example of such amino-alcohol is 12-aminododecane-1-ol.

The reaction of these isocyanate-functional polymers with difunctional acids or amines or amino-acids, where the acid can be carboxylic or sulfonic acid, affords a product which, after neutralization with a suitable base, is a water-dispersible or water-soluble system.

The polymers of this invention are also useful in coatings curable on exposure to atmospheric moisture. As an example, polymers having a number average molecular weight not exceeding 3,000 can be spray applied at greater than 60 volume percent of solids. One polymer, containing approximately 40-60% IEM, 4-15% lauryl mercaptan, and the balance butyl acrylate, is particularly useful. It can cure by absorbing moisture from the ambient atmosphere to produce a crosslinked film with the evolution of small quantities of carbon dioxide. This process can be facilitated by the presence of organometallic dryers such as dibutyltin dilaurate without compromising the one-package stability of the coating composition. Small amounts of antioxidants and UV screening chemicals can also be added for extreme exposure conditions. Such additives, however, are not usually necessary because of the inherent stability of the crosslinked network to oxidation, hydrolysis, and light.

The property balance that can be achieved makes the moisture-cured isocyanate-functional polymers suitable for coating both rigid and flexible substrates. They are particularly useful in exterior ambient temperature curing or low bake finishes for automobiles, trucks, aircraft, and railroad equipment.

A variety of substrates can be coated with coating compositions based on the polymers of this invention; the substrates can be rubbery, semi-rigid, or metallic. Examples of suitable substrates are flexible hydrocarbon rubbers such as EPDM (terpolymers of ethylene, propylene, and diene), butyl rubber, styrene-butadiene rubber, polybutadiene rubber or polyisoprene rubber; urethane and Hytrel ® (registered trademark of E. I. du Pont de Nemours and Company) polyester rubber; injection-molded polyester urethane; elastoplastic microcellular urethane foam; ABS (terpolymers of acrylonitrile, butadiene, and styrene); steel; aluminum.

These coating compositions can be applied by any of the standard application methods such as spray or roller coating and brushing. When the coating is applied by spraying, it is possible to utilize a spray solids content higher than has been customary with many commercially useful prior art coatings. Solids contents up to 100% can be obtained with low molecular weight diol crosslinking agents. The coating thickness can be from 0.002 millimeter to 0.3 millimeter, the preferred thickness being approximately 0.05 millimeter.

The coatings based on the isocyanate-containing polymers can be cured by moisture at room temperature or the crosslinking process can be carried out at room temperature or at elevated temperatures depending on the complementary functional materials and catalyst, if any, to be utilized. Curing temperatures of up to about 150° C. at times of up to about 30 minutes are often used.

The catalyst selection can depend on the complementary functional groups present to facilitate their reaction with the —NCO groups. Among the useful curing catalysts are: dibutyltin dilaurate, stannous octoate, dimethylbenzylamine, triethylenediamine, dibutyltin oxide. Based on polymer solids, 0.01 to 0.1% of one or more of these compounds is usually sufficient.

Coating compositions based on this invention can be pigmented. Typical usable pigments are metallic oxides, preferably titanium dioxide, zinc oxide, iron oxide, and the like, metallic flakes such as aluminum flake, metallic powders, metallic hydroxides, Afflair ® Flake pigments (a registered trademark of E. I. du Pont de Nemours and Company), i.e., mica coated with titanium dioxide, sulfates, carbonates, carbon black, silica, talc, china clay, and other pigments, organic dyes, and flakes. The amount of pigment utilized can depend on the type of final application of these coatings. Pigment/binder ratios between 3/100 and 100/100 are acceptable with the preferred P/B range being 3/100–50/100 for automotive applications and near the maximum P/B ratio of 100/100 for other industrial coatings.

EXAMPLES

The following examples illustrate the invention. All ratios, parts, proportions and percentages in these examples (as throughout the specification) are on a weight basis and temperature is in degrees centigrade unless otherwise indicated.

All of the 2-isocyanatoethyl methacrylate (IEM) used contained greater than 0.005% by weight of hydrolyzable chlorine. Thus, the IEM of Examples 1 and 2 contained 0.03% total chlorine and 0.009% hydrolyzable chlorine. It also contained 27.1% NCO (Theory=27.1) and was 99.9% pure as determined by gas chromatography.

Molecular weights were determined by gel permeation chromatography. In gel permeation chromatography, a solution of the material under investigation is passed through a series of columns containing porous beads, each column being packed with beads of a given porosity. As the solution passes through the columns, the various components diffuse into the beads and out again insofar as molecular volume and pore size are compatible. Since the smaller molecules can diffuse into more pores, they take longer to elute and are separated from the larger molecules which elute quickly.

For the polymeric systems of this invention, samples are dissolved in tetrohydrofuran to obtain an approximately 0.5% solutiom weight/volume and are passed through a system of Styragel ® columns having porosites of $10^4$, $10^3$, and 60 Å at a flow rate of 1 ml/min at room temperature. The location (molecular weight) and amount of material eluting are indicated by a differential refractometer. The system is calibrated by measurements on polystyrene standards having a polydispersity of less than 1.1.

Molecular weights are computer calculated on the basis of the polystyrene calibrations from data digitized and recorded on tape for reading into a PDP-10 computer using a program modifying the procedure of Pickett, Cantow, and Johnson, J. Applied Polymer Sci., 10, 917–924 (1966) and J. Polymer Science (C), (21), 67–81 (1968). This gives an accurate comparison of the molecular weights and molecular weight distributions of similar resins. The absolute accuracy of the molecular weights depends on how closely the molecular weight/molecular volume relationship of the polymer corresponds to the molecular weight/molecular volume relationship of the polystyrene standard.

EXAMPLE 1

A. An isocyanate-containing polymer is prepared as follows:

|  | Parts |
| --- | --- |
| Portion 1 | |
| 2-Isocyanatoethyl methacrylate (IEM) | 143.60 |
| Methyl methacrylate | 47.80 |
| Butyl methacrylate | 40.50 |
| Ethyl acetate | 134.00 |
| Portion 2 | |
| Lauryl mercaptan | 43.20 |
| Portion 3 | |
| IEM | 95.70 |
| Methyl methacrylate | 71.70 |
| Butyl methacrylate | 60.60 |
| Azobis(isobutyronitrile) | 3.25 |
| Portion 4 | |
| Lauryl mercaptan | 18.50 |
| Ethyl acetate | 44.60 |
| Portion 5 | |
| Azobis(isobutyronitrile) | 0.75 |
| Ethyl acetate | 25.00 |

The polymerization vessel is a one-liter four-necked round-bottomed flask fitted with a stirrer, pot thermometer and two Y tubes each carry a reflux condenser and dropping funnel. The reaction is nitrogen blanketed.

Portion 1 is charged to the flask and heated to reflux at about 95° over 25 minutes. Portion 2 is then added in about 10 seconds. Portions 3 and 4 are charged to separate dropping funnels and added to the refluxing solution (temperature approximately 90°) over 120 minutes at a constant rate of addition. After 5 additional minutes at approximately 90°, Portion 5 is added over 1 hour. The temperature drops to 85° C. and is held there for an additional hour.

The resulting polymer has a composition of isocyanatoethyl methacrylate/methyl methacrylate/butyl methacrylate/lauryl mercaptan (as a thioalkyl group) in the ratio 45.9/22.9/19.4/11.8; Gardner-Holdt Viscosity=S; Solids Content=71.7%; $M_w$=5,3000; $M_n$=1.800. Based on the total weight of the polymer solution, the residual monomer content (weight %) is, for the monomers as listed above, 0.15, 0.22, 0.21 and 0.27, respectively.

The polymer is clear, colorless, free of gel particles, and does not change in viscosity or appearance over a period of for weeks.

B. Twenty grams of the polymer solution catalyzed with 0.1 milliliter of a 10% (in Cellosolve ® acetate) solution or dibutyltin dilaurate, when cast onto glass, cures with atmospheric moisture to afford a clear, colorless film having a Knoop hardness (after 1 week at 50% relative humidity) of 10 and which is impervious to ethyl acetate.

EXAMPLE 2

A. A solution of a polyol is formed by reacting the following ingredients:

| | Parts |
|---|---|
| Portion 1 | |
| Xylene | 415.39 |
| Hydroxyethyl acrylate | 218.50 |
| Phthalic anhydride | 269.50 |
| "Cardura" E ester - (a mixed ester described in U.S. Pat. No. 3,275,583, issued September 27, 1966, and is a glycidyl ester of a synthetic tertiary carboxylic acid of the formula | 481.25 |

where R is a tertiary aliphatic hydrocarbon group of 8–10 carbon atoms)

| | Parts |
|---|---|
| Portion 2 | |
| Xylene | 621.15 |
| Portion 3 | |
| Styrene | 567.88 |
| Methyl methacrylate | 288.74 |
| Hydroxyethyl acrylate | 99.13 |
| t-Butyl peroxide | 17.33 |
| Portion 4 | |
| Xylene | 363.13 |
| Cellosolve ® acetate | 158.00 |
| Total | 3,500.00 |

Portion 1 is charged into a reactor equipped with a reflux condenser and is heated to a reflux temperature and is held at this temperature for about 1 hour. Portion 2 is then added and the mixture is heated to its reflux temperature. Portion 3 is premixed and slowly added over a 3-hour period while maintaining the reflux condition and then the reaction mixture is held at the reflux temperature for an additional 3 hours. The heat is removed from the reaction vessel and Portion 4 is added.

The resulting solution has a solids content of about 55% and a Gardner-Holdt viscosity of about X and the polymer has an acid number less than 10. The polymer is the copolymerization and esterification product of the following reactants:

| | Parts |
|---|---|
| Styrene | 29.5 |
| Methyl methacrylate | 15.0 |
| Hydroxyethyl acrylate | 16.5 |
| Phthalic anhydride | 14.0 |
| "Cardura" E ester | 25.0 |
| Total | 100.0 |

B. An isocyanate-containing polymer is prepared as follows:

| | Parts |
|---|---|
| Portion 1 | |
| Styrene | 390.4 |
| IEM | 387.1 |
| Ethyl acetate | 250.0 |
| Portion 2 | |
| Lauryl mercaptan | 17.9 |
| Portion 3 | |
| Azobis(isobutyronitrile) | 17.5 |
| Ethyl acetate | 100.0 |
| Styrene | 90.8 |
| IEM | 131.7 |

-continued

| | Parts |
|---|---|
| Lauryl mercaptan | 104.0 |

The polymerization vessel is a 3-liter four-necked flask equipped as described in Example 1.

Portion 1 is charged to the flask and heated to reflux at 111° and portion 2 is added. Reflux is maintained by heating as necessary as Portion 3 is added over 90 minutes. The mixture is allowed to reflux at 93° over an additional 270 minutes.

The resulting clear, colorless solution has a solids content of 76.5% by weight and a calculated monomer composition, by weight %, of styrene, 42.6; IEM, 45.9; lauryl mercaptan, 10.7; fragments from azobis(isobutyronitrile), 0.8, based on the assumption that ½ of the initiator is combined with the polymer. The molecular weights are $\overline{M}_w = 3,000$ and $\overline{M}_n = 790$.

C. A coating composition is prepared by combining:

| | Parts |
|---|---|
| Polyol as prepared in (A) above | 15.200 |
| Toluene | 1.500 |
| Cellosolve ® acetate | 6.200 |
| Ethyl acetate | 4.100 |
| Dibutyltin dilaurate | 0.001 |
| Polymer as prepared in (B) above | 5.600 |

Tensile test data obtained on a cured film, approximately 0.05 millimeter thick, obtained by drawing down this composition on glass (at 10% minimum test rate), indicate the suitability of the coating for use on rigid substrates: Elongation=4.9%; Tensile Strength=5000 psi; Initial Modulus=187,000 psi.

EXAMPLE 3

A. An isocyanate-containing polymer is prepared as follows:

| | Parts |
|---|---|
| Portion 1 | |
| IEM | 736.0 |
| n-Butyl acrylate | 1,040.0 |
| Ethyl acetate | 825.0 |
| Portion 2 | |
| Lauryl mercaptan | 193.0 |
| Portion 3 | |
| Azobis(isobutyronitrile) | 4.4 |
| Ethyl acetate | 75.0 |
| IEM | 682.0 |
| n-Butyl acrylate | 258.0 |
| Lauryl mercaptan | 206.0 |

The polymerization vessel is a 5-liter four-necked flask equipped as described in Example 1.

Portion 1 is charged to the flask and heated to reflux. Portion 2 is then added. Reflux is maintained by heating as necessary as Portion 3 is added over 90 minutes. Reflux is continued for an additional 210 minutes. The final polymer has a solids content of 75.0% and a viscosity of 60 centipoises.

The molecular weights are $\overline{M}_w = 5,600$ and $\overline{M}_n = 1,900$. The polymer has the following composition, by weight: butyl acrylate, 41.6; IEM, 45.5; lauryl mercaptan, 12.8; fragments from azobis(isobutyronitrile), 0.07.

B. A coating composition is prepared as follows:

| Component | Parts |
|---|---|
| Polyol as prepared in Example 2(A) | 28.130 |
| Toluene | 2,800 |
| Cellosolve ® acetate | 11.500 |
| Ethyl acetate | 7.500 |
| Dibutyltin dilaurate | 0.002 |
| Polymer from (A) above | 11.500 |

The film has the following tensile properties after 28 days of air drying: Elongation=37%; Tensile Strength=3500 psi; Initial Modulus=118,000 psi. This composition is suitable for use on flexible substrates.

EXAMPLE 4

An isocyanate-containing polymer is prepared as follows:

| | Parts |
|---|---|
| Portion 1 | |
| IEM | 21.90 |
| Butyl acrylate | 45.00 |
| Ethyl acetate | 44.20 |
| Lauryl mercaptan | 6.80 |
| Portion 2 | |
| Azobis(isobutyronitrile) | 0.01 |
| Ethyl acetate | 2.00 |
| Portion 3 | |
| IEM | 52.20 |
| Butyl acrylate | 36.30 |
| Lauryl mercaptan | 15.40 |
| Azobis(isobutyronitrile) | 0.90 |
| Toluene | 36.00 |
| Portion 4 | |
| Butyl acrylate | 68.00 |
| IEM | 76.30 |
| Toluene | 37.80 |
| Ethyl acetate | 21.00 |
| Azobis(isobutyronitrile) | 13.50 |
| Portion 5 | |
| Azobis(isobutyronitrile) | 0.10 |
| Ethyl acetate | 4.00 |

The polymerization vessel is a 1-liter, four-necked flask, equipped as described in Example 1.

Portion 1 is charged to the flask and brought to reflux over 15 minutes and Portion 2 is added. Reflux is maintained by heating as necessary as Portion 3 is added over 40 minutes. Reflux is maintained by heating as Portion 4 is added over 80 minutes. After an additional 20 minutes at reflux, Portion 5 is added and, after an additional 30 minutes at reflux, the polymerization is substantially complete. The solution has a solids content of 68.2% and a viscosity of 70 centipoises.

The polymer has the composition IEM/butyl acrylate/mercaptan/initiator in the proportions 45.7/45.4/6.7/2.2 with $\overline{M}_w$=6,500 and $\overline{M}_n$=2,100.

This polymer is self-crosslinking when exposed to ambient (50% RH) air for one week in the following mixture: 10 grams of polymer solution and 0.05 milliliter of a 10% dibutyltin dilaurate solution on Cellosolve ® acetate.

The 68% solution has a viscosity of 70 centipoises and thus can be categorized as a high solids coating. It is coated on glass using a 6-mil blade to form, after a one-week cure at 25° (50% RH), a 0.07-millimeter thick, clear, colorless, film with a 6.1 Knoop hardness, having the following tensile properties: elongation to break, 20%; tensile strength, 3000 psi; initial modulus, 71,000 psi.

EXAMPLE 5

A. An isocyanate-containing polymer is prepared as follows:

| | Parts |
|---|---|
| Portion 1 | |
| IEM | 260 |
| Styrene | 241 |
| Ethyl acetate | 283 |
| Portion 2 | |
| n-Dodecyl mercaptan | 14.7 |
| Portion 3 | |
| Styrene | 488 |
| IEM | 520 |
| Portion 4 | |
| Azobis(isobutyronitrile) | 34 |
| Cellosolve ® acetate | 266 |
| Ethyl acetate | 266 |
| Portion 5 | |
| n-Dodecyl mercaptan | 155.3 |
| Portion 6 | |
| Ethyl acetate | 573 |

Portion 1 was charged to a 5-liter reaction flask and brought to 98°, and Portion 2 was then added over about 1 minute; the reaction was held at reflux throughout all subsequent addition and hold periods. Portion 3 was added at a uniform rate over 180 minutes and Portion 4, the initiator or catalyst, was added simultaneously with 3 over 300 minutes. Portion 5 was added simultaneously with 3 and 4 according to the following schedule:

| Minutes | Parts |
|---|---|
| 0–50 | 62.2 |
| 50–100 | 38.6 |
| 100–180 | 41.0 |
| 180–240 | 13.5 |
| | 155.3 |

This schedule is computed to make the minimum variation in molecular weight of the polymer being formed relative to minimum process complexity. After Portion 4, the catalyst feed, was finished, the reaction mixture was held at reflux for one additional hour. Heat was turned off and the clear, colorless solution thinned with Portion 6.

The following is a time/temperature log:

| Time (min) | Temperature | Comments |
|---|---|---|
| 0 | 26° | Portion 1 was charged with heat on. |
| 50 | 98° | Portion 2 was added over about 1 minute. |
| 55 | 100° | Reflux; addition of Portions 3, 4, 5 begun as scheduled. |
| 235 | 100.5° | Reflux; addition of Portion 3 completed. |
| 295 | 97° | Reflux; addition of Portion 5 completed. |
| 355 | 95.5° | Reflux; addition of Portion 4 completed. |
| 415 | 96° | Reflux; hold period completed; heat off; added Portion 6. |

The product was a 55.2% solution in ethyl acetate and Cellosolve ® acetate of the IEM/styrene/mercaptan polymer of the ratio 46/43/10 (+1% azobis-(isobutyronitrile)-derived fragments).

| Found | Analysis | Calculated |
|---|---|---|
| % Solids | 55.00* | 55.23 |
| % NCO | 6.86 | 6.90 |
| Brookfield Viscosity, 100 RPM, No. 2 spindle, centipoise | — | 88.00 |
| Residual IEM monomer | — | 2000 ppm** in solution |

*In the calculation of solids, the assumption is made that half the weight of the azobis(isobutyronitrile) is converted to volatile products.
**Based on data from duplicating experiments. These values show that none of the n-dodecyl mercaptan reacted with the isocyanate groups and that the conversion of isocyanatoethyl methacrylate to polymer was 99.2%.

B. Application of the polymer from A as the hardener in a urethane finish with the polymer polyol described in Example 2 showed that in a typical refinish flow-through spray booth, the concentration of IEM monomer in the air at the sprayman was 11 parts per billion by volume. Although no standard has been set for this monomer, the accepted standard for toluene diisocyanate, a related material, is 20 parts per billion.

EXAMPLE 6

In a substantial repetition of Example 5A, a higher concentration of monomer (less solvent with catalyst) and a catalyst feed time raised from 300 to 340 minutes increased conversion of IEM to 99.48% and produced a solution containing 1300 ppm of residual IEM monomer.

EXAMPLE 7

In another substantial repetition of Example 5A with an increase in catalyst feed time from 340 minutes (Example 6) to 380 minutes, a reaction was run with the following charge:

| Ingredient | Parts |
|---|---|
| Portion 1 | |
| Ethyl acetate | 293.0 |
| IEM | 269.0 |
| Styrene | 249.0 |
| Portion 2 | |
| Styrene | 506.0 |
| IEM | 539.0 |
| Portion 3 | |
| Azobis(isobutyronitrile) | 35.0 |
| Cellosolve ® acetate | 275.0 |
| Ethyl acetate | 199.0 |
| Portion 4 | |
| n-Dodecyl mercaptan | 175.0 |
| Portion 5 | |
| Ethyl acetate | 729.0 |
| | 3,255.5 |

(including 0.5 p of extra initiator)

Portion 1 was charged to the flask, 15.2 parts of Portion 4 was added and reflux was begun. Portions 2, 3 and 4 were started simultaneously, Portion 2 being added over 180 minutes and Portion 3 over 380 minutes. Portion 4 was added in parts, 51.5 p over 0–45 minutes, 99.5 p over 45–190 minutes, and 9.8 p over 190–245 minutes. After the catalyst (Portion 4) was fed completely, reflux was continued for 40 minutes and the thinner, Portion 5, was added.

The changes, as compared with Examples 5 and 6, resulted in a slightly higher concentration of monomer during most of the reaction, a reaction temperature about 3° higher (100°–104°), and a longer reaction time with a substantial level of initiator present.

The product was a solution of the thioalkyl-terminated copolymer of IEM/styrene/dodecyl mercaptan of the ratio: 46/43/10; Solids=53.68%; —NCO=6.65%; Brookfield Viscosity=75.6 cps, 100 RPM, No. 2 Spindle. The conversion of isocyanatoethyl methacrylate was 99.80%, and the product contained only 500 ppm of residual IEM monomer.

EXAMPLE 8

In the following two runs, the initiator 2-t-butylazo-2-cyanobutane was employed. The chain-transfer agent was n-dodecyl mercaptan in A and t-dodecyl mercaptan in B. The hindered mercaptan is seen as more resistant to an elevated temperature as far as the production of an isocyante-polymer (rather than a thiourethane) is concerned.

A. In a 1-l flask fitted for addition polymerization with two dropping funnels and under a nitrogen blanket, the following charge was reacted:

| | Parts |
|---|---|
| Portion 1 | |
| Cellosolve ® acetate | 96 |
| Toluene | 64 |
| Portion 2 | |
| IEM | 170 |
| Styrene | 173 |
| Portion 3 | |
| n-Dodecyl mercaptan | 15 |
| 2-t-Butylazo-2-cyanobutane (TBC) | 15 |
| Portion 4 | |
| TBC | 2 |
| Toluene | 5 |
| | 540 |

Portion 1 was charged to the flask and brought to reflux. Meanwhile, Portion 3 was mixed, no color change or temperature rise being noted, and put in one of the dropping funnels. Portion 2 was mixed and put in the second dropping funnel. Portions 2 and 3 were added to 1 over a 3-hour period at reflux, the temperature rising to 128°–130°. Portion 4 was added after ½ hour and held for an additional ½ hour. The product was diluted to 54% solids with ethyl acetate. $\overline{M}_w$=12,000; $\overline{M}_n$=4,000; Brookfield Viscosity=277.2 cps; 100 RPM No. 2 Spindle; % —NCO=6.43 (6.42, 6.43; Theoretical NCO=6.86, i.e., a loss of mercaptan of 92%).

B. In a 2-l flask fitted for polymerization, the following was reacted:

| | Parts |
|---|---|
| Portion 1 | |
| Cellosolve ® acetate | 192 |
| Toluene | 128 |
| Portion 2 | |
| IEM | 368 |
| Styene | 328 |
| Portion 3 | |
| TBC | 64 |
| Portion 4 | |
| t-Dodecyl mercaptan | 32 |
| Toluene | 32 |
| Portion 5 | |

-continued

| | Parts |
|---|---|
| n-Butyl acrylate | 6.4 |
| | 1,050.4 |

Portion 1 was put in the flask and brought to reflux (133°). Portion 2 was added over 170 minutes. Portion 3 was simultaneously added, 60 parts over 195 minutes and 4 parts over the following 30 minutes. Portion 4 was added beginning 5 minutes into the run and finishing 155 minutes later. Portion 5 was added at 180 minutes and the run finished by holding 30 minutes at 130°.

Although the temperature rose here to 133°, the hindered mercaptan, t-dodecyl mercaptan, showed no loss. 100% of the expected value of —NCO, 8.65% (8.65% calc.) was found.

EXAMPLE 9

A polymer was made from the following:

| Ingredient | Parts |
|---|---|
| Portion 1 | |
| n-Butyl acrylate | 216.00 |
| IEM | 209.34 |
| Methyl ethyl ketone (MEK) | 540.00 |
| Methyl isobutyl ketone (MIBK) | 322.20 |
| Portion 2 | |
| n-Dodecyl mercaptan | 49.14 |
| Portion 3 | |
| n-Dodecyl mercaptan | 187.56 |
| Azobis(isobutyronitrile) | 22.542 |
| MEK | 234.12 |
| MIBK | 139.50 |
| Portion 4 | |
| n-Butyl acrylate | 504.00 |
| IEM | 870.66 |
| Portion 5 | |
| MIBK | 162.00 |
| Azobis(isobutyronitrile) | 2.25 |

Portion 1 was charged to a 5-liter flask and heated to reflux under nitrogen. Portion 2 was added at one time and addition of Portions 3 and 4 was begun. There was added 67.0% of Portion 3 over the first 50 minutes, 14.02% over the next 30 minutes, and the remainder over the next 100 minutes. Simultaneously, 67.07% of Portion 4 was added over the first 50 minutes, 15.27% over the next 30 minutes and the remainder over the next 100 minutes. Portion 5 was added over 30 minutes following the addition of Portions 3 and 4. Solvent (853.5 parts) was distilled off, leaving a high solids solution of the resin n-butyl acrylate/IEM/lauryl mercaptan/azobis(isobutyronitrile) residue in the ratio 33.0/52.5/11.5/3. Properties were as follows: $\overline{M}_n=1362$; $\overline{M}_w=2620$; Solids=78.47%; Gardner-Holdt Viscosity=G+¼; % —NCO=11.17; IEM Residual=0.12%.

B. Millbases of several colors, e.g., white and red, were prepared in normal fashion in xylene and mixed with a resin of about the composition of that from A with a P/B ratio of 50/100. The total solids content of the resultant paint was about 65% and the viscosity was 100 centipoise.

Dibutyltin dilaurate was added and the paints were applied to black-primed Bonderite 40 treated steel panels by means of an air spray gun equipped with an air cap. Air pressure was 65 lb/in$^2$ (197.13 kg/m$^2$) at the gun with the gun open.

The paint films were cured in an oven equipped with a steam inlet. Baking for 2 minutes at 190° F. (81.7° C.) was followed by 30 minutes at 190° F. and 20% relative humidity, a procedure found necessary because of condensation on the panels. The colored coatings gave weather protection to the steel panels.

EXAMPLE 10

A. A 2-ethylhexyl acrylate/2-isocyanatoethyl methacrylate copolymer was prepared as follows:

| | Parts |
|---|---|
| Portion 1 | |
| 2-Ethylhexyl acrylate | 678 |
| IEM | 485 |
| Ethyl acetate | 530 |
| Lauryl mercaptan | 135 |
| Portion 2 | |
| Azobis(isobutyronitrile) | 4.4 |
| Ethyl acetate | 53 |
| Portion 3 | |
| 2-Ethylhexyl acrylate | 168 |
| IEM | 429 |
| Lauryl mercaptan | 124 |
| Portion 4 | |
| Azobis(isobutyronitrile) | 0.5 |
| Ethyl acetate | 20.0 |

Portion 1 was charged to a flask equipped as described in Example 1 and heated to reflux. Reflux was maintained by heating as necessary while portions 2 and 3 were added simultaneously over 150 minutes. The reaction mixture was held at reflux for 20 minutes, Portion 4 added over 20 minutes, and reflux continued for 60 minutes. The product was a solution of the polymer IEM/2-ethylhexyl acrylate/mercaptan in the weight ratio 45.2/41.9/12.8.

The solution of polymer had a Gardner-Holdt viscosity of E-¼ (1.19 stokes) and a solids content of 77.4% (Theory=77.0%). The isocyanate content of the polymer was 9.56% (Theory=9.48%), and the molecular weights were $\overline{M}_w=3700$ and $\overline{M}_n=1450$.

The polymer is soluble in heptane and thus is particularly useful as a modifier for medium and long oil alkyds. It can also be used as the crosslinking agent in hydrocarbon organosol enamels.

B. An IEM/2-ethylhexyl acrylate copolymer similar to that of A showed a residual IEM monomer content of 0.10% (1000 ppm) upon initial preparation. A sample was held for 60 days at 50°. The residual IEM was then only 300 ppm, a decrease of about 70%. The decrease is attributed to homopolymerization of the monomer.

EXAMPLE 11

A methyl methacrylate/n-butyl acrylate/2-isocyanatoethyl methacrylate copolymer was prepared as follows:

| | Parts |
|---|---|
| Portion 1 | |
| Methyl methacrylate | 86.2 |
| n-Butyl acrylate | 26.3 |
| IEM | 49.7 |
| Toluene | 365.0 |
| Portion 2 | |
| Lauryl mercaptan | 13.8 |
| Portion 3 | |
| Methyl methacrylate | 288.0 |
| n-Butyl Acrylate | 37.0 |

| | Parts |
|---|---|
| IEM | 138.2 |
| Azobis(isobutyronitrile) | 21.1 |
| Portion 4 | |
| Azobis(isobutyronitrile) | 0.5 |
| Toluene | 8 |

Portion 1 was charged under nitrogen to a 2-liter flask equipped with a stainless steel stirrer, thermometer, reflux condenser, addition funnel and nitrogen inlet. It was heated to reflux, and Portion 2 added. Reflux was maintained by heating as necessary and Portion 3 (495 ml) added in two parts, the first (376 ml) in 67 minutes and the second (119 ml), over the next 128 minutes. After an additional 30 minutes, Portion 4 was added and reflux continued for 30 more minutes.

The product was a solution of the copolymer IEM/methyl methacrylate/n-butyl acrylate/mercaptan in the weight ratio 28.9/57.6/9.7/2.1. It had a Gardner-Holdt viscosity of Z 2+½ (40 stokes); Solids Content=63.0% (Theory=62.1%); Isocyanate Content=7.5% (Theory=7.7%); $\overline{M}_n=2800$; and $\overline{M}_2=8800$.

EXAMPLE 12

A 2-isocyanatoethyl methacrylate/styrene copolymer was made with butyl 3-mercaptopropionate as chain-transfer agent from the following ingredients:

| | Parts |
|---|---|
| Portion 1 | |
| Ethyl acetate | 240 |
| IEM | 276 |
| Styrene | 250 |
| Portion 2 | |
| Styrene | 513 |
| IEM | 558 |
| Portion 3 | |
| Azobis(isobutyronitrile) | 36 |
| Cellosolve ® acetate | 282 |
| Ethyl acetate | 204 |
| Portion 4 | |
| Butyl 3-mercaptopropionate | 145 |
| Portion 5 | |
| Butyl acrylate | 16 |
| Portion 6 | |
| Ethyl acetate | 800 |

Portion 1 was charged to a 5-1 flask and brought to reflux at about 100°. 13 p of Portion 4 (the mercaptan) was added at one time and the remainder as follows; 99.5 p over the next 65 min; 26.5 p over the next 45 min; and 6 p over the next 30 min. Beginning with the addition of Portion 4, Portion 2 was added over 60 min, Portion 5 was added after 180 min and Portion 3 over 260 min. Following a hold at 100° after the complete addition of Portion 3, Portion 6 was added for dilution.

The product was a solution of an IEM/styrene/mercaptan polymer in the proportion 47/43/8.2 (with about 1% initiator residue); $\overline{M}_w=6000$; $\overline{M}_n=2100$; Solids=53.9%; NCO=6.67%; Brookfield Viscosity=82.4 cps, 100 RPM No. 2 Spindle.

EXAMPLE 13

A polymer of IEM/methyl methacrylate/lauryl methacrylate/mercaptan in the proportions 30/60/10/2.1 (with 1.7% initiator residue) was made up from the following:

| Ingredient | Parts |
|---|---|
| Portion 1 | |
| Methyl methacrylate | 224.6 |
| Lauryl methacrylate | 51.4 |
| IEM | 134.3 |
| Toluene | 291.1 |
| Portion 2 | |
| Lauryl mercaptan | 37.4 |
| Toluene | 100.0 |
| Portion 3 | |
| Methyl methacrylate | 603.2 |
| Lauryl methacrylate | 91.4 |
| IEM | 285.5 |
| Azobis(isobutyronitrile) | 44.6 |
| Portion 4 | |
| Methyl methacrylate | 190.5 |
| Lauryl methacrylate | 28.9 |
| IEM | 90.2 |
| Azobis(isobutyronitrile) | 13.8 |
| Portion 5 | |
| Azobis(isobutyronitrile) | 2.5 |
| Toluene | 25.0 |

Portion 1 was charged into a 5-1 round bottomed flask equipped with a stirer and nitrogen inlet and thoroughly flushed with nitrogen. The charge was heated to reflux (about 112°) over 34 minutes and Portion 2 added all at once. Portion 3 was added at reflux over 55 minutes and then, successively, Portion 4 over 155 and Portion 5 over 5 minutes. The reaction mixture was held at reflux to 30 additional minutes and allowed to cool. The maximum reflux temperature was about 122° and the final one, 111°. The IR spectrum of the product was consistent with the formula above; Solids=63.6% (Calc'd.=63.5%); $\overline{M}_w=6,800$; $\overline{M}_n=3500$; Polydispersity=1.962; —NCO=7.9% (Calc'd.=7.8%).

EXAMPLE 14

A polymer of the composition IEM/butyl acrylate/styrene/lauryl mercaptan residue/azobis(isobutyronitrile) residue in the proportions 53.27/19.6/19.1/7.04/1.01 was prepared from the following:

| | Parts |
|---|---|
| Portion 1 | |
| n-Butyl acrylate | 39.0 |
| IEM | 48.0 |
| Styrene | 12.0 |
| Ethyl acetate | 49.3 |
| Portion 2 | |
| Lauryl mercaptan | 4.5 |
| Ethyl acetate | 15.0 |
| Portion 3 | |
| Butyl acrylate | 19.5 |
| IEM | 111.0 |
| Styrene | 45.0 |
| Azobis(isobutyronitrile) | 3.9 |
| Portion 4 | |
| Lauryl mercaptan | 16.5 |
| Toluene | 15.0 |
| Portion 5 | |
| Toluene | 49.3 |
| Azobis(isobutyronitrile) | 2.1 |

Portion 1 was charged to a flask equipped for polymerization and brought to reflux. Portion 2 was added and the mixture brought back to reflux. Portions 3 and 4 were added concurrently over 150 minutes. After 120 minutes of the addition of 3 and 4, Portion 5 was started and added over 180 minutes. After the addition of 5 was complete, reflux was maintained for 30 minutes, the heat was turned off, and the mixture was cooled.

The product at room temperature was a thick solution: Solids=70.26% (Theoretical=69.89%); Gardner-Holdt Viscosity=0 (3.70 stokes); —NCO=9.94%; $\overline{M}_w$=7150 and $\overline{M}_n$=2700.

COMPARATIVE EXAMPLES

The low molecular weight of the polymers of this invention makes them especially desirable as curing or crosslinking agents for urethane enamels, rivaling in this respect the commonly used nonpolymeric polyisocyanates such as Desmodur N. In addition, they are more stable upon storage than the commonly used polyisocyanates, producing a lower percentage of toxic monomers. These properties are shown in the following comparative examples. Examples B, C, D and E are based on butyl acrylate/IEM/mercaptan copolymers of the proportions of about equal amounts of acrylate/IEM and from 1-12% of mercaptan.

EXAMPLE A

Polymers comprising methyl methacrylate/IEM and 2-ethylhexyl acrylate/IEM, both in the weight ratio 48/52, were prepared according to the procedure of Example 5 of Bortnick U.S. Pat. No. 2,718,516, i.e., at reflux in solvent without a chain-transfer agent. In all cases, the solutions were of extremely high viscosity and gelled before molecular weights could be obtained. Molecular weights ($\overline{M}_n$) are estimated to have been greater than 100,000.

EXAMPLE B

Gloss in urethane finishes is dependent upon the molecular weight of the crosslinking agent used. In tests run with commercial Imron® enamels (Imron® is a trademark of E. I. duPont de Nemours and Company) replacing Desmodur N (based on hexamethylene diisocyanate (HDI)) with the butyl acrylate/IEM copolymer at an approximate —NCO/—OH ratio of 1.15/1.0 according to commercial practice, the following results are obtained:

| Butyl acrylate/IEM Copolymer | | 20° Gloss | |
|---|---|---|---|
| $M_n$ | $M_w$ | White | Blue Metallic |
| 840 | 3300 | 85 | 79 |
| 1900 | 7300 | 85 | 76 |
| 2800 | 10000 | 84 | 76 |
| 5300 | 18000 | 73 | 53 |
| 8100 | 27000 | 67 | 49 |

The appearance becomes marginally acceptable according to commercial standards by 5300 $\overline{M}_n$. In comparison, Desmodur N yields are: White, 20° Gloss=90; Blue Metallic=82.

EXAMPLE C

Package stability of the polymer solutions against gelation is dependent on molecular weight. The gelation is probably caused by the 0.05% water in the urethane-grade solvents used in the experiments. Drying solvents to the complete elimination of water is not practicable. The following shows the relationship between molecular weight and gelation:

| $\overline{M}_n$ | Time to Gelation |
|---|---|
| 8100 | 3 months |
| 5300 | ca. 3 months |
| 2800 | ca. 6 months |
| 1900 | 1 year |

A package life of about 6 months is as short as can be considered commercially useful.

EXAMPLE D

Substrates and primers are frequently sanded before application of a top coat. Sand scratches left by such reactment are much more easily obliterated by low-molecular weight coating material than by high. The filling of sand scratches in a primer used under moisture-cured films is related to $\overline{M}_n$ in about the following way:

| $\overline{M}_n$ | 2-Mil Film |
|---|---|
| 8100 | Scratches sharply defined. |
| 5300 | Moderate scratch definition. |
| 2800 | Good scratch filling, poor definition. |
| 1900 | Scratches not evident. |

EXAMPLE E

Current government regulations to control solvent emission encourage spraying at at least 45% solids, preferably at 55% or greater. Moreover, 100 cps is the approximate maximum usable in suction spraying.

The following table shows the relationship to be expected between $\overline{M}_n$ and solubility (e.g., in ethyl acetate) for the butyl acrylate copolymer:

| $\overline{M}_n$ of Copolymer | Solids Content at 100 Centipoises Viscosity (25°) |
|---|---|
| 8100 | 35 |
| 5300 | 45 |
| 2800 | 55 |
| 1900 | 65 |
| 900 | 75 |

EXAMPLE F

In contrast to the decrease in residual toxic isocyanate monomer shown in Example 10B, the commercial crosslinking agent Desmodur N shows the following monomeric hexamethylene diisocyanate (HDI) content:

| | 50° C. | 60° C. |
|---|---|---|
| Initial | 0.55% HDI | 0.45% |
| 60 days | 0.9% HDI | 0.83% |
| Percentage change | +64 | +84 |

What is claimed is:

1. A coated article comprising a substrate carrying a coating formed by
   (A) applying to the substrate an isocyanate-functional polymer of a number average molecular weight of 500-10,000 formed from at least 10% by weight of isocyanatoalkyl acrylate or isocyanatoalkyl methacrylate, polymerized alone or with a polymerizable comonomer, any polymerizable comonomer being at least one member of the group consisting of alkyl acrylates and methacrylates; styrene; ethylene; vinyl acetate; and vinyl chloride, in the presence of 1–20% by weight, based on the weight of the polymer, of a mercaptan chain-transfer agent RSH, R— being $C_4$–$C_{12}$ alkyl, phenyl, benzyl or

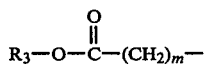

where $R_3$— is $C_4$–$C_{12}$, alkyl, phenyl or benzyl and m is 0–8, at least 10% by number of the polymer molecules having in terminal position a residue of the mercaptan chain-transfer agent, and (B) curing the applied polymer upon the substrate.

2. The coated article of claim 1 wherein the polymer is formed from the monomers isocyanatoethyl methacrylate, methyl methacrylate, butyl methacrylate and mercaptan.

3. The coated article of claim 1 wherein the polymer is formed from the monomers isocyanatoethyl methacrylate, styrene and mercaptan.

4. The coated article of claim 1 wherein the polymer is formed from the monomers isocyanatoethyl methacrylate, butyl acrylate and mercaptan.

5. The coated article of claim 1 wherein the polymer is formed from the monomers isocyanatoethyl methacrylate, ethylhexyl acrylate and mercaptan.

6. The coated article of claim 1 wherein the polymer is formed from the monomers isocyanatoethyl methacrylate, methyl methacrylate, n-butyl acrylate and mercaptan.

7. The coated article of claim 1 wherein the polymer is formed from the monomers isocyanatoethyl methacrylate, methyl methacrylate, lauryl methacrylate and mercaptan.

8. The coated article of claim 1 wherein the polymer is formed from the monomers isocyanatoethyl methacrylate, butyl acrylate, styrene and mercaptan.

9. A coated article of claim 1 wherein the substrate is a metal.

10. A coated article of claim 1 wherein the substrate is flexible.